United States Patent [19]
Doiron

[11] Patent Number: 4,881,698
[45] Date of Patent: Nov. 21, 1989

[54] FISHING REEL INCLUDING A ONE-WAY BRAKE

[76] Inventor: Gerald J. Doiron, 40 Franklin St., Athol, Mass. 01331

[21] Appl. No.: 151,156

[22] Filed: Feb. 1, 1988

[51] Int. Cl.4 .................... A01K 89/015; A01K 89/02
[52] U.S. Cl. .................................. 242/256; 188/82.1; 192/44; 192/45; 242/267
[58] Field of Search ...................... 242/84.1 J, 84.5 R, 242/84.5 A, 84.51 R, 84.51 A, 211, 217, 218, 219, 220; 192/45, 48.6, 44; 188/82.1, 82.2, 82.77, 82.84

[56] References Cited

U.S. PATENT DOCUMENTS

| 724,208 | 3/1903 | Rockwell | 242/220 X |
|---|---|---|---|
| 1,228,673 | 6/1917 | Hribar | 188/82.84 |
| 1,353,170 | 9/1920 | McKimmy | 242/220 |
| 1,465,486 | 8/1923 | Sandiford | 192/44 |
| 1,864,142 | 6/1932 | Meyer | 188/82.84 X |
| 3,469,799 | 9/1969 | Hull | 242/84.5 R X |
| 3,874,615 | 4/1975 | Fukushima | 242/219 |
| 4,620,621 | 11/1986 | Kulczycki et al. | 192/44 X |
| 4,750,687 | 6/1988 | Sievert et al. | 242/218 |

FOREIGN PATENT DOCUMENTS 389694 3/1933 United Kingdom ................ 242/219

Primary Examiner—Joseph J. Hail, III
Attorney, Agent, or Firm—Charles R. Fay

[57] ABSTRACT

A fishing reel with an anti-reverse to free spool adjustment including a cylindrical series of spaced peripheral grooves on the spool spindle and a hand manipulated rotary member setting variable pressures on a ball in a ratchet member surrounding the series of grooves, thereby locking the spindle or releasing the spindle to a variable degree.

1 Claim, 2 Drawing Sheets

FISHING REEL INCLUDING A ONE-WAY BRAKE

FIELD OF THE INVENTION

Anti-reverse, free spool reel for line for fishing.

BACKGROUND OF THE INVENTION

This type of reel is old as to the desired function but the adjustable drag and lock of the prior art depend on friction brake construction which is not positive in action, especially after extensive use, while the present invention presents a positive response as to free spool, lock, and adjustment.

SUMMARY OF THE DISCLOSURE

Almost any type of housing and reel foot can be used, and the reel spool per se is conventional as is the crank handle, except that the spool spindle and the hub of the crank handle amount and enclose the structure of the novel anti-reverse and spool drag. Inwardly slightly of the spool spindle end that carries the crank, there is a peripheral circular row of mutually spaced grooves arranged in parallel and parallel to the axis of the spindle. These grooves are very small to fit onto the spool spindle surface, and the grooves form or at least outline a cylindrical formation, and preferably the grooves are very closely spaced. Outboard of the grooves as a group on the spindle the spindle includes means to receive the crank, and centrally of the crank there is a round finger piece that is rotatable independently of the crank by finger or thumb to control the adjustment of the drag and lock, or free spool conditions. This rotatable finger piece is operatively associated with a circular ratchet-like device rotatably mounted on the spindle in the region of the grooves. The ratchet device contains at least one "blind" hole, tangentially arranged to open onto the grooves in the spindle and contains e.g. two balls, like ball bearings, being held in the hole by an O-ring. An abutment end to the hole presses with variable pressure on one ball, thrusting it firmly into a groove, upon manual partial rotation of the finger piece in one direction relative to the crank; or if the finger piece is rotated in degrees in the opposite direction, pressure is gradually relieved, letting the spool rotate, under decreasing control, until the spool is completely free. Thus, there is a positive lock of the spool, gradually decreasing drag, and finally a free spool action.

PREFERRED EMBODIMENT OF THE INVENTION

Figure 1:
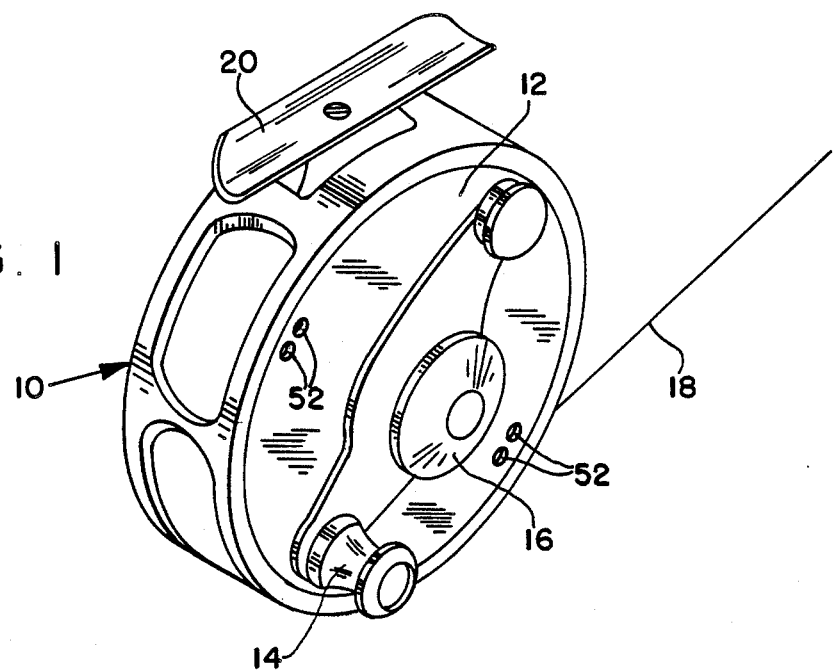
FIG. 1 is a perspective view of a fishing reel embodying the new anti-reverse ratchet and drag.
Figure 2:
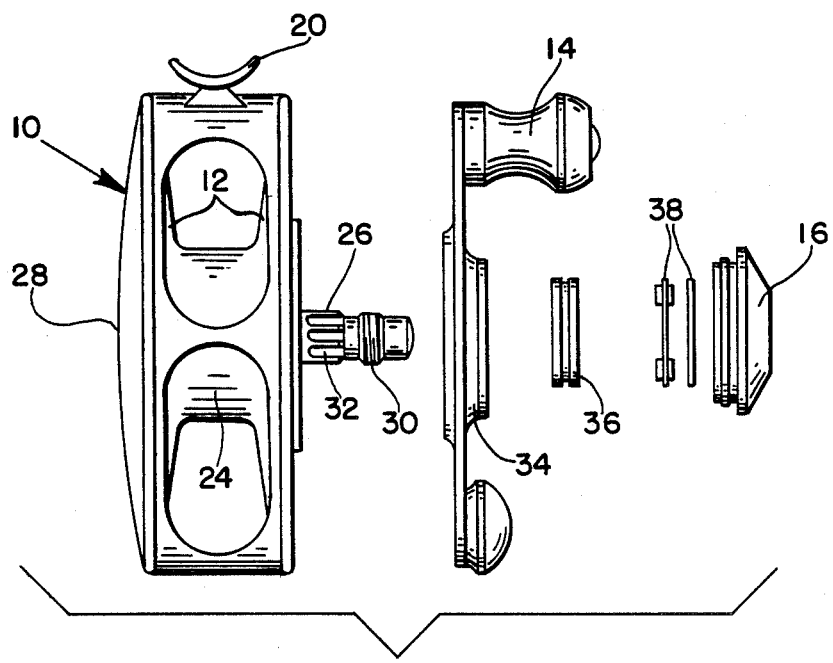
FIG. 2 is an exploded view of the reel of FIG. 1.
Figure 3:
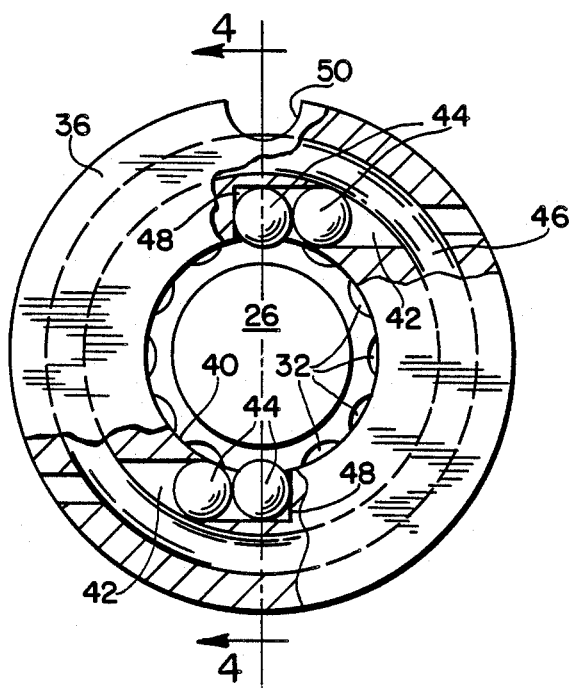
FIG. 3 is an elevational view of the ratchet and its relation to the spool spindle of the reel, on a greatly enlarged scale.
Figure 4:
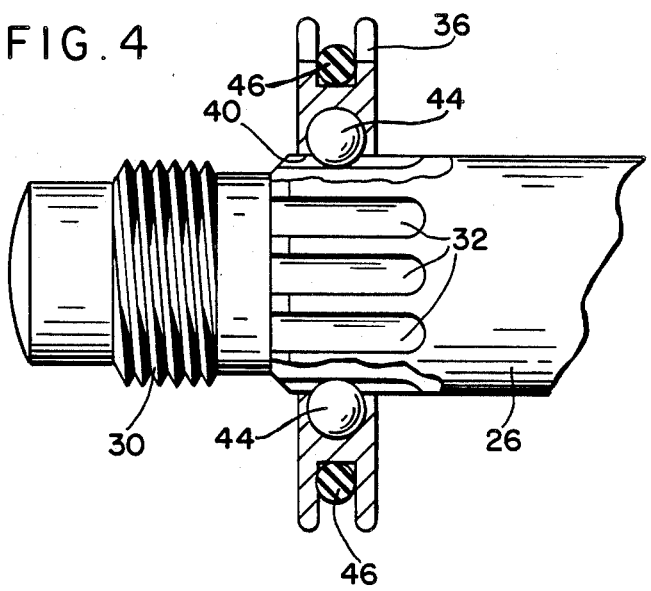
FIG. 4 is a section taken on line 4——4 of FIG. 3.

The fishing reel comprises a housing 10, a reel spool therein as at 12, a spool handle or crank 14, and a ratchet-like and brake control piece 16 for manual adjustment of the drag and anti-reverse functions, the ratchet not being visible in FIG. 1, but being shown in FIGS. 2, 3, and 4. The line is shown at 18 and the reel foot at 20. The spool, housing, foot, and some kind of crank are generally found in many fishing reels, whether such prior art reels have drag adjustments or not.

The exploded view, FIG. 2, is intended to show the relation of the conventional reel parts with the novel anti-reverse drag adjustment, the line 18 not being shown in FIG. 2, but this line of course winds on and from the spool hub 24. Spindle 26 is secured by a hub, not shown, having a fastening screw 28 at the left side of housing 10, as usual. The spool 12 is rotarily mounted on the spindle which extends from the right side of the spool and housing, FIG. 2, providing for a peripheral circular row of mutually spaced like grooves at 32 forming one element of the adjustable drag. The control piece 16 is mounted on threads 30.

The crank 14 has a raised hub 34 that houses the anti-reverse member 36 which is turned in either direction by the digitally manually operated brake knob (control piece 16). Necessary or convenient thrust rings, O-rings, etc., may be used where wanted, the reference 38 for instance showing a tubular bearing - washer between the control knob 16 and member 36. Such commercially obtainable devices are used by the reel maker as required. The crank frictionally engages the spool to drive it.

The member 36 is shown in detail in FIGS. 3 and 4. This member is circular with a relatively large central opening at 40 to accommodate the grooved end of spindle 26, see the relationship of these parts in FIG. 4. The member 36 has a U-shaped periphery that allows for the blind hole 42 extending in a tangential relation from the center hole 40 outwardly. This blind hole is loosely occupied by two or more ball bearings or similar elements 44 held in against the O-ring 46 and the spindle 26 in area thereof having grooves 32. The control piece (brake knob) 16 turns the member 36 as shown in FIG. 3; locking the ball bearings to the spindle or releasing them to a point of free reel spinning of the spool.

The lock is accomplished by an abutment 48 on the member 36, at the blind hole, that bears with greater or less pressure on the ball bearings. The greater the pressure, the more rigid are the balls held in a spindle groove 32, and relaxed pressure allows the grooves to force the balls out of the groove. The control piece may be secured to the member 36 by interengaging means such as notch 50 with a pin or the like on the control piece.

Two separate locking ball bearings 44 and corresponding blind holes are shown but actually one such device is enough, or two or more can be provided.

The anti-reverse member 36 is easily detached from the crank handle, and upon being reversed, it changes the reel from right hand operation to left hand, and this can be done in mid-stream without tools, if desired. The small holes 52 in the spool are for entering and reversing the free end of the tippet to locate and hold it.

I claim:

1. A fishing reel comprising a housing, a spool mounted therein, a spindle for the spool, said spindle having an axis, a handle connected to the spindle for turning the spool, and a connection between the spindle and handle, said connection comprising a removable circular ratchet member on the handle and a series of parallel, mutually peripherally spaced grooves on the spindle, a separate element in the ratchet, means mounting the element for limited motion to and from the grooves, and an abutment on the member to contact and apply pressure to the element to tend to move the element to firm contact in a groove, or selectively to relax pressure on the element to allow it to be loose in its mounting means so that the spool is enabled to rotate freely, the means mounting the element being in the form of a blind hole intersecting the spindle in the area of the grooves, the blind hole being tangential to the spindle axis, and an O-ring on the ratchet member closing the blind hole.

* * * * *